US006646045B2

(12) United States Patent
Eichenauer

(10) Patent No.: US 6,646,045 B2
(45) Date of Patent: Nov. 11, 2003

(54) THERMOPLASTIC MOLDING COMPOSITIONS

(75) Inventor: Herbert Eichenauer, Dormagen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 57 days.

(21) Appl. No.: 09/998,440

(22) Filed: Nov. 30, 2001

(65) Prior Publication Data

US 2002/0103296 A1 Aug. 1, 2002

(30) Foreign Application Priority Data

Dec. 5, 2000 (DE) .......................... 100 60 411

(51) Int. Cl.[7] .............................................. C08F 255/00
(52) U.S. Cl. ............................ 525/63; 525/64; 525/66; 525/67; 525/68; 525/73; 525/80; 525/260; 525/261; 525/219.3; 525/201; 525/219; 525/223; 525/225
(58) Field of Search ........................ 525/71, 64, 66, 525/67, 68, 80, 73, 260, 261, 63; 526/201, 219, 219.3, 223, 225

(56) References Cited

U.S. PATENT DOCUMENTS

| 4,009,226 | A | 2/1977 | Ott et al. | |
|---|---|---|---|---|
| 4,009,227 | A | 2/1977 | Ott et al. | |
| 5,200,441 | A | 4/1993 | Kim et al. | 523/221 |
| 5,352,728 | A | 10/1994 | Kim et al. | 524/501 |
| 5,883,189 | A | 3/1999 | Eichenauer et al. | 525/71 |
| 5,969,041 | A | 10/1999 | Eichenauer et al. | 525/71 |
| 6,323,279 | B1 | 11/2001 | Guntherberg et al. | 525/70 |

FOREIGN PATENT DOCUMENTS

| DE | 41 13 326 | 10/1992 |
|---|---|---|
| EP | 522710 | 1/1993 |
| EP | 680978 | 4/1995 |
| WO | 00/04068 | 1/2000 |

Primary Examiner—Jeffrey Mullis
(74) Attorney, Agent, or Firm—Joseph C. Gil; Aron Preis

(57) ABSTRACT

Thermoplastic molding compositions containing graft polymers produced with different initiator systems are disclosed. The compositions are distinguished by a combination of good toughness and reduced opacity. As a result, appreciably smaller quantities of pigment are needed to color the molding composition.

25 Claims, No Drawings

THERMOPLASTIC MOLDING COMPOSITIONS

FIELD OF THE INVENTION

The invention relates to thermoplastic molding compositions and more particularly to compositions containing grafted rubbers.

SUMMARY OF THE INVENTION

Thermoplastic molding compositions containing graft polymers produced with different initiator systems are disclosed. The compositions are distinguished by a combination of good toughness and reduced opacity. As a result, appreciably smaller quantities of pigment are needed to colour the molding composition.

BACKGROUND OF THE INVENTION

ABS molding compositions have, for many years, been used in large quantities as thermoplastic resins for the production of all kinds of moldings. The range of properties of these resins can be varied within broad limits.

In view of the constantly growing demands made on plastics materials, and of new areas of application, ABS polymers with special combinations of properties are increasingly required.

One of these special combinations of properties relates to ABS polymers for the production of coloured mouldings with notched impact strength, particularly in the area of application of housings and covers. The smallest possible quantities of colorants should be required to obtain the desired colour in these applications, and this can be achieved e.g. by means of a lower opacity of the polymer material and a lighter colour in the non-coloured state (low yellowness index).

When the technology of emulsion polymerisation is used, the attempt is usually made to achieve the desired properties by combining different graft rubber components with a thermoplastic resin matrix.

Thus, for example, DE-A 24 20 357 and DE-A 24 20 358 describe the use of special graft polymers obtained by persulfate initiation with defined values for, inter alia, rubber contents, particle size, degree of grafting, styrene:acrylonitrile ratio in the graft polymers and in the styrene/acrylonitrile copolymer used to achieve improved values for toughness, processability and surface gloss. Despite the relatively complicated production of these moulding compositions, no optimum toughness/flowability and toughness/gloss relationships, and only unsatisfactory inherent colours, are achieved.

Similar problems are displayed in the products produced in accordance with EP-A 470 229, EP-A 473 400 and WO 91/13118 wherein, by combining a graft polymer having a low rubber content and small particle diameter obtained by redox initiation with a graft polymer having a high rubber content and larger particle diameter obtained by redox initiation, impact-resistant, high-gloss thermoplastic resins are obtained. However, the flow characteristics and the opacities of these moulding compositions do not meet the constantly increasing demands made on materials of this kind.

In DE-A 41 13 326, thermoplastic moulding compositions with two different graft products are described, wherein the rubber contents of the graft rubbers are a maximum of 30 wt. % in each case. No more detailed information on the properties can be derived from the document; however, the variability of the products or of the product properties is probably severely limited owing to the low rubber contents of the graft polymers.

DE-A 196 49 255 teaches the production of ABS moulding compositions with very high gloss values while preserving good values for toughness and processability, wherein a combination of a coarse-particle graft polymer produced by persulfate initiation and a fine-particle graft polymer produced by persulfate initiation is employed, adhering to special values for particle size distribution and gel content of the rubbers used.

Disadvantages of these products are, in addition to the necessity of adhering to numerous parameters during production, the sometimes inadequate toughness values together with unsatisfactory inherent colour and too high an opacity.

The object therefore existed of providing compositions that are not characterized by the above-mentioned disadvantages and that feature a combination of good toughness, low yellowness index and reduced opacity and wherein other properties are not be negatively affected.

Even small reductions in the opacity, which can be determined very accurately, lead to a noticeable reduction in the quantity of pigment needed to colour the moulding compositions.

The invention provides compositions containing

A) at least one grafted rubber produced by free-radical emulsion polymerisation of at least one vinyl monomer, preferably a copolymer of styrene and acrylonitrile in a weight ratio of 90:10 to 50:50, styrene and/or acrylonitrile optionally being completely or partly replaced by α-methylstyrene, methyl methacrylate or N-phenylmaleimide, particularly preferably of styrene and acrylonitrile in the presence of at least one rubber a) present in the form of a latex, with a glass transition temperature of less than 0° C., preferably a butadiene rubber, particularly preferably polybutadiene, using at least one persulfate compound as the initiator, B) at least one grafted rubber produced by free-radical emulsion polymerisation of at least one vinyl monomer, preferably a copolymer of styrene and acrylonitrile in a weight ratio of 90:10 to 50:50, styrene and/or acrylonitrile optionally being completely or partly replaced by α-methylstyrene, methyl methacrylate or N-phenylmaleimide, particularly preferably of styrene and acrylonitrile in the presence of at least one rubber b) present in the form of a latex, with a glass transition temperature of less than 0° C., preferably a butadiene rubber, particularly preferably polybutadiene, using at least one azo compound as the initiator, and optionally C) at least one thermoplastic, rubber-free polymer obtained by polymerisation of at least one resin-forming vinyl monomer, preferably a copolymer of styrene and acrylonitrile in a weight ratio of 90:10 to 50:50, styrene and/or acrylonitrile optionally being completely or partly replaced by α-methylstyrene, methyl methacrylate or N-phenylmaleimide.

In general, the compositions according to the invention can contain the grafted rubbers A) and B) in any quantitative proportions, usually in the range of 5 to 95 parts by weight A) and 95 to 5 parts by weight B); 20 to 90 parts by weight A) and 10 to 80 parts by weight B) are preferred, 30 to 80 parts by weight A) and 20 to 70 parts by weight B) are particularly preferred, and 40 to 75 parts by weight A) and 25 to 60 parts by weight B) are especially preferred (based in each case on 100 parts by weight A+B).

The optional thermoplastic rubber-free vinyl polymer C) may be used in quantities of 50 to 2000 parts by weight, preferably 100 to 1500 parts by weight and particularly preferably 150 to 1000 parts by weight (based in each case on 100 parts by weight A+B).

The grafted rubber polymers A) and B) used preferably have rubber contents of more than 50 wt. %, particularly preferably more than 55 wt. % and especially preferably more than 58 wt. %.

The compositions may further contain additional rubber-free thermoplastic resins that are not built up from vinyl monomers, these thermoplastic resins may be used in quantities of up to 1000 parts by weight, preferably up to 700 parts by weight and particularly preferably up to 500 parts by weight (based in each case on 100 parts by weight A+B+C).

The rubber a) present in the form of a latex used to produce the grafted rubber A) and also the rubber b) present in the form of a latex used to produce the grafted rubber B) may be present in the form of latices with monomodal, bimodal, trimodal or multimodal particle size distributions.

Those combinations of grafted rubbers A) and B) in the production of which at least one of the rubber latices a) and b) used has a bimodal or trimodal particle size distribution are preferred.

Those combinations of grafted rubbers A) and B) in the production of which the rubber latex a) used has a monomodal particle size distribution and the rubber latex b) used has a bimodal particle size distribution, or in the production of which the rubber latex a) used has a monomodal particle size distribution and the rubber latex b) used has a trimodal particle size distribution, or in the production of which the rubber latex a) used has a bimodal particle size distribution and the rubber latex b) used has a bimodal particle size distribution, or in the production of which the rubber latex a) used has a bimodal particle size distribution and the rubber latex b) used has a trimodal particle size distribution, or in the production of which the rubber latex a) used has a bimodal particle size distribution and the rubber latex b) used has a monomodal particle size distribution are particularly preferred.

Those combinations of grafted rubbers A) and B) in the production of which the rubber latex a) used has a monomodal particle size distribution and the rubber latex b) used has a bimodal particle size distribution or in the production of which the rubber latex a) used has a bimodal particle size distribution and the rubber latex b) used has a bimodal particle size distribution are especially preferred. The weight average particle diameters ($d_{50}$ value) of the monomodal, bimodal, trimodal or multimodal rubber latices a) and b) used to produce the grafted rubbers A) and B) can be varied within broad limits. Suitable particle diameters are e.g. between 50 and 600 nm, preferably between 80 and 550 nm and particularly preferably between 100 and 500 nm.

The average particle diameters ($d_{50}$) of the rubber latices a) used are preferably smaller than the average particle diameters ($d_{50}$) of the rubber latices b) used, the average particle diameters of the rubber latices a) and b) used particularly preferably differing by at least 40 nm, especially preferably by at least 80 nm.

Rubbers a) and b) present in the form of latices suitable for the production of the grafted rubbers according to component A) and component B) are in principle all rubber polymers with a glass transition temperature of less than 0° C. Examples of these rubber polymers are polydienes, such as e.g. polybutadiene and polyisoprene, alkyl acrylate rubbers based on $C_1$–$C_8$ alkyl acrylates, such as e.g. poly-n-butyl acrylate, polysiloxane rubbers, such as e.g. products based on polydimethylsiloxane.

Preferred rubbers a) and b) for the production of the grafted rubbers A) and B) are butadiene polymer latices, which can be produced by emulsion polymerisation of butadiene. This polymerisation process is known, and described e.g. in Houben-Weyl, Methoden der Organischen Chemie, Makromolekulare Stoffe, part 1, p. 674 (1961), Thieme Verlag Stuttgart. Up to 50 wt. %, preferably up to 30 wt. %, (based on the total quantity of monomers used for the butadiene polymer production) of one or more monomers copolymerisable with butadiene can be used as comonomers.

As examples of these monomers, isoprene, chloroprene, acrylonitrile, styrene, α-methylstyrene, $C_1$–$C_4$ alkyl styrenes, $C_1$–$C_8$ alkyl acrylates, $C_1$–$C_8$ alkyl methacrylates, alkylene glycol diacrylates, alkylene glycol dimethacrylates and divinylbenzene may be mentioned and are preferred; butadiene is preferably used alone. It is also possible in the production of a) and b) to produce a fine-particle butadiene polymer first, by known methods, and then to agglomerate it in a known manner to adjust it to the required particle size. Relevant techniques are described (cf. EP-A 0 029 613; EP-A 0 007 810; DD-A 144 415; DE-A 12 33 131; DE-A 12 58 076; DE-A 21 01 650; US-A 1 379 391).

In principle, the rubber latices a) and b) may also be produced by emulsifying fine-particle rubber polymers in aqueous media (cf. Japanese patent application 55 125 102).

To produce rubber latices a) and b) with bimodal, trimodal or multimodal particle size distributions, monomodal rubber latices with different average particle sizes and a narrow particle size distribution are preferably mixed together.

Monomodal rubber latices with a narrow particle size distribution within the meaning of the invention are understood as those latices having a breadth of the particle size distribution (measured as $d_{90}$-$d_{10}$ from the integral particle size distribution) of 30 to 150 nm, preferably 35 to 100 nm and particularly preferably 40 to 80 nm.

The differences between the average particle diameters ($d_{50}$ value from the integral particle size distribution) of the rubber latices used for mixing in the preferred production of bimodal, trimodal or multimodal particle size distributions are preferably at least 30 nm, particularly preferably at least 60 nm and especially preferably at least 80 nm.

Monomodal rubber latices with a narrow particle size distribution are preferably produced by emulsion polymerisation of suitable monomers, preferably mixtures of monomers containing butadiene, particularly preferably butadiene, by the so-called seed polymerisation technique, in which a fine-particle polymer, preferably a rubber polymer, particularly preferably a butadiene polymer, is first produced as a seed latex and then further polymerised by further reaction with rubber-forming monomers, preferably with monomers containing butadiene, to form larger particles (cf. e.g. Houben-Weyl, Methoden der Organischen Chemie, Makromolekulare Stoffe part 1, p. 339 (1961), Thieme Verlag Stuttgart).

The preparation of rubber latices is preferably carried out using the seed batch process or the seed feed process.

The gel contents of the rubber latices a) and b) used for the production of the grafted rubbers A) and B) are not generally critical and can be varied within broad limits. Values of between approx. 30% and 98%, preferably between 40% and 95%, are common.

The gel contents of the rubber latices a) used are preferably higher than the gel contents of the rubber latices b) used, the gel contents of the rubber latices a) and b) used particularly preferably differing by at least 5%, especially preferably by at least 10%.

The average particle diameter $d_{50}$ and the $d_{10}$ and $d_{90}$ values be established by ultracentrifuge measurement (cf. W. Scholtan, H. Lange: Kolloid Z. u. Z. Polymere 250, p. 782 to 796 (1972)); the values quoted for the gel content refer to the determination by the wire basket method in toluene (cf. Houben-Weyl, Methoden der Organischen Chemie, Makromolekulare Stoffe, part 1, p. 307 (1961), Thieme Verlag Stuttgart).

The gel contents of the rubber latices a) and b) may be adjusted in a manner that is known in principle, by applying appropriate reaction conditions (e.g. high reaction temperature and/or polymerisation to a high conversion and optional addition of substances having a crosslinking effect to achieve a high gel content or e.g. low reaction temperature and/or termination of the polymerisation reaction before excessive crosslinking occurs and optional use of molecular weight regulators such as e.g. n-dodecyl mercaptan or t-dodecyl mercaptan to achieve a low gel content). Conventional anionic emulsifiers, such as alkyl sulfates, alkyl sulfonates, aralkyl sulfonates, soaps of saturated or unsaturated fatty acids and of alkaline disproportionated or hydrogenated abietic or tall oil acids, can be used as the emulsifier, emulsifiers with carboxyl groups (e.g. salts of $C_{10}$–$C_{18}$ fatty acids, disproportionated abietic acid) preferably being employed.

The graft polymerization in the production of grafted rubbers A) and B) may be performed in that the monomer mixture is added to the rubber latex a) or the rubber latex b), in batch operations or continuously, and polymerised.

Special monomer:rubber ratios are preferably adhered to in this process. To produce the grafted rubber A) according to the invention, inorganic salts selected from ammonium persulfate, potassium persulfate, sodium persulfate or mixtures thereof must be used.

The reaction temperature for the production of the grafted rubber A) according to the invention may be varied within broad limits. It is generally 25° C. to 160° C., preferably 40° C. to 100° C. and particularly preferably 50° C. to 90° C., the temperature difference between the beginning and end of the reaction being at least 10° C., preferably at least 15° C. and particularly preferably at least 20° C. (starting with a lower temperature at the beginning of the reaction).

To produce the grafted rubber B) according to the invention, at least one azo compound must be used as the initiator.

Azo compounds that are suitable according to the invention are, for example, compounds of formulae (I), (II), (III) and (IV):

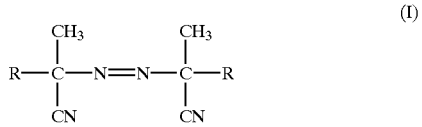
(I)

with R=$CH_3$, $C_2H_5$, $C_3H_7$, $C_4H_9$ including the isomeric groups n-$C_3H_7$, i-$C_3H_7$, n-$C_4H_9$, i-$C_4H_9$, t-$C_4H_9$,

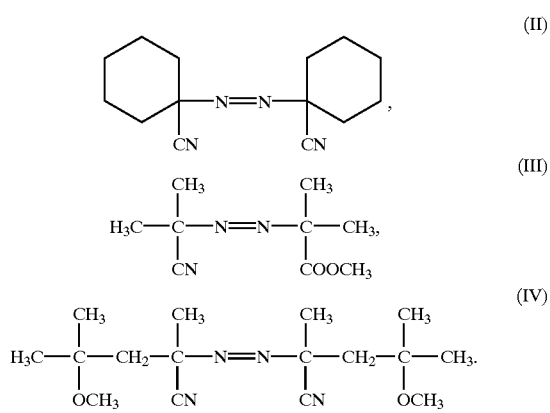

Preferred azo compounds that are suitable according to the invention are compounds of formula (I), compounds (I) with R=$CH_3$, $C_2H_5$, $C_4H_9$ being particularly preferred.

The reaction temperature for the production of the grafted rubber B) according to the invention may be varied within broad limits. It is generally 25° C. to 120° C., preferably 35° C. to 100° and particularly preferably 40° C. to 85° C., the temperature difference between the beginning and end of the reaction being at least 10° C., preferably at least 15° C. and particularly preferably at least 20° C.

To produce the grafted rubber A) according to the invention, preferably 20 to 60 parts by weight, particularly preferably 25 to 50 parts by weight and especially preferably 25 to 42 parts by weight of at least one vinyl monomer, preferably a mixture of styrene and acrylonitrile, styrene and/or acrylonitrile optionally being completely or partly replaced by α-methylstyrene, methyl methacrylate or N-phenylmaleimide, are polymerised in the presence of preferably 40 to 80 parts by weight, particularly preferably 50 to 75 parts by weight and especially preferably 58 to 75 parts by weight (based on solids in each case) of a rubber latex a).

To produce the grafted rubber B) according to the invention, preferably 25 to 70 parts by weight, particularly preferably 30 to 60 parts by weight and especially preferably 30 to 42 parts by weight of at least one vinyl monomer, preferably a mixture of styrene and acrylonitrile, styrene and/or acrylonitrile optionally being completely or partly replaced by α-methylstyrene, methyl methacrylate or N-phenylmaleimide, are polymerised in the presence of preferably 30 to 75 parts by weight, particularly preferably 40 to 70 parts by weight and especially preferably 58 to 70 parts by weight (based on solids in each case) of a rubber latex b).

The monomers used in these graft polymerisations are preferably mixtures of styrene and acrylonitrile in a weight ratio of 90:10 to 50:50, particularly preferably in a weight ratio of 80:20 to 65:35.

In addition, molecular weight regulators can be used in the graft polymerisation, preferably in quantities of 0.05 to 2 wt. %, particularly preferably in quantities of 0.1 to 1 wt. % (based in each case on total monomer quantity in the graft polymerisation step).

Suitable molecular weight regulators are, for example, alkyl mercaptans, such as n-dodecyl mercaptan, t-dodecyl mercaptan; dimeric α-methylstyrene; terpinolene.

Copolymers of styrene and acrylonitrile in a weight ratio of 95:5 to 50:50 are preferably used as the rubber-free copolymers C), styrene and/or acrylonitrile optionally being completely or partly replaced by α-methylstyrene, methyl methacrylate or N-phenylmaleimide.

Copolymers C) with proportions of <30 wt. % of incorporated acrylonitrile units are particularly preferred.

These copolymers preferably possess average molecular weights $\overline{M}_w$ of 20 000 to 200 000 and limiting viscosity numbers [η] of 20 to 110 ml/g (measured in dimethyl formamide at 25° C.).

Details on the production of these resins are described e.g. in DE-A 2 420 358 and DE-A 2 724 360. Vinyl resins produced by bulk polymerisation or solution polymerisation have proved particularly suitable. One or more of these resins may be added.

Apart from thermoplastic resins built up from vinyl monomers, the use of polycondensates, e.g. aromatic polycarbonates, aromatic polyester carbonates, polyesters or polyamides, as the rubber-free copolymer is possible in the compositions according to the invention.

Suitable thermoplastic polycarbonates and polyester carbonates are known (cf. e.g. DE-A 1 495 626, DE-A 2 232 877, DE-A 2 703 376, DE-A 2 714 544, DE-A 3 000 610, DE-A 3 832 396, DE-A 3 077 934), which can be produced e.g. by reaction of diphenols of formulae (V) and (VI)

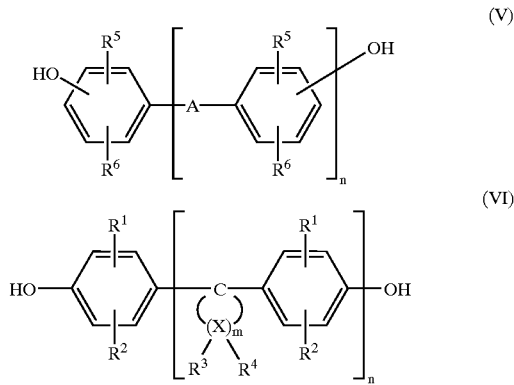

wherein
A is a single bond, $C_1$–$C_5$ alkylene, $C_2$–$C_5$ alkylidene, $C_5$–$C_6$ cycloalkylidene, —O—, —S—, —SO—, —SO$_2$— or —CO—,
$R^5$ and $R^6$, independently of one another, denote hydrogen, methyl or halogen, especially hydrogen, methyl, chlorine or bromine,
$R^1$ and $R^2$, independently of one another, denote hydrogen, halogen, preferably chlorine or bromine, $C_1$–$C_8$ alkyl, preferably methyl, ethyl, $C_5$–$C_6$ cycloalkyl, preferably cyclohexyl, $C_6$–$C_{10}$ aryl, preferably phenyl, or $C_7$–$C_{12}$ aralkyl, preferably phenyl $C_1$–$C_4$ alkyl, especially benzyl,
m is a whole number from 4 to 7, preferably 4 or 5,
n is 0 or 1,
$R^3$ and $R^4$ can be selected for each X individually and, independently of one another, signify hydrogen or $C_1$–$C_6$ alkyl and
X signifies carbon,
with carbonic acid halides, preferably phosgene, and/or with aromatic dicarboxylic acid dihalides, preferably benzene dicarboxylic acid dihalides, by phase boundary polycondensation or with phosgene by polycondensation in the homogeneous phase (the so-called pyridine process), it being possible to adjust the molecular weight by known means using an appropriate quantity of known chain terminators.

Suitable diphenols of formulae (V) and (VI) are e.g. hydroquinone, resorcinol, 4,4'-dihydroxydiphenyl, 2,2-bis(4-hydroxyphenyl)propane, 2,4-bis(4-hydroxyphenyl)-2-methylbutane, 2,2-bis(4-hydroxy-3,5-dimethylphenyl)propane, 2,2-bis(4-hydroxy-3,5-dichlorophenyl)propane, 2,2-bis(4-hydroxy-3,5-dibromophenyl)propane, 1,1-bis(4-hydroxyphenyl)cyclohexane, 1,1-bis(4-hydroxyphenyl)-3,3,5-trimethylcyclohexane, 1,1-bis(4-hydroxyphenyl)-3,3-dimethylcyclohexane, 1,1-bis(4-hydroxyphenyl)-3,3,5,5-tetramethylcyclohexane or 1,1-bis(4-hydroxyphenyl)-2,4,4-trimethylcyclopentane.

Preferred diphenols of formula (V) are 2,2-bis(4-hydroxyphenyl)propane and 1,1-bis(4-hydroxyphenyl)cyclohexane and the preferred phenol of formula (VI) is 1,1-bis(4-hydroxyphenyl)-3,3,5-trimethylcyclohexane.

Mixtures of diphenols may also be used.

Suitable chain terminators are e.g. phenol, p-tert.-butylphenol, long-chain alkylphenols such as 4-(1,3-tetramethylbutyl)phenol according to DE-A 2 842 005, monoalkylphenols, dialkylphenols with a total of 8 to 20 C atoms in the alkyl substituents according to DE-A 3 506 472, such as p-nonylphenol, 2,5-di-tert.-butylphenol, p-tert.-octylphenol, p-dodecylphenol, 2-(3,5-dimethylheptyl)phenol and 4-(3,5-dimethylheptyl)phenol. The required quantity of chain terminators is generally 0.5 to 10 mole %, based on the sum of diphenols (V) and (VI).

The suitable polycarbonates or polyester carbonates may be linear or branched; branched products are preferably obtained by incorporating 0.05 to 2.0 mole %, based on the sum of the diphenols used, of trifunctional or more than trifunctional compounds, e.g. those with three or more than three phenolic OH groups.

The suitable polycarbonates or polyester carbonates may contain aromatically bonded halogen, preferably bromine and/or chlorine; they are preferably halogen-free. They have average molecular weights ($\overline{M}_w$, weight average), determined e.g. by ultracentrifugation or nephelometry, of 10 000 to 200 000, preferably 20 000 to 80 000.

Suitable thermoplastic polyesters are preferably polyalkylene terephthalates, i.e. reaction products of aromatic dicarboxylic acids or their reactive derivatives (e.g. dimethyl esters or anhydrides) and aliphatic, cycloaliphatic or arylaliphatic diols and mixtures of these reaction products.

Preferred polyalkylene terephthalates may be produced from terephthalic acids (or their reactive derivatives) and aliphatic or cycloaliphatic diols with 2 to 10 C atoms by known methods (Kunststoff-Handbuch, vol. VIII, p. 695 ff, Carl Hanser Verlag, Munich 1973).

In preferred polyalkylene terephthalates, 80 to 100, preferably 90 to 100 mole % of the dicarboxylic acid groups are terephthalic acid groups and 80 to 100, preferably 90 to 100 mole % of the diol groups are ethylene glycol and/or 1,4-butanediol groups.

In addition to ethylene glycol or 1,4-butanediol groups, the preferred polyalkylene terephthalates may contain 0 to 20 mole % of groups of other aliphatic diols with 3 to 12 C atoms or cycloaliphatic diols with 6 to 12 C atoms, e.g. groups of 1,3-propanediol, 2-ethyl-1,3-propanediol, neopentyl glycol, 1,5-pentanediol, 1,6-hexanediol, 1,4-cyclohexanedimethanol, 3-methyl-1,3- and -1,6-pentanediol, 2-ethyl-1,3-hexanediol, 2,2-diethyl-1,3-propanediol, 2,5-hexanediol, 1,4-di(β-hydroxyethoxy)benzene, 2,2-bis(4-hydroxycyclohexyl)propane, 2,4-dihydroxy-1,1,3,3-tetramethylcyclobutane, 2,2-bis(3-β-hydroxyethoxyphenyl)propane and 2,2-bis(4-hydroxypropoxyphenyl)propane (DE-A 2 407 647, 2 407 776, 2 715 932).

The polyalkylene terephthalates may be branched by incorporating relatively small quantities of 3- or 4-hydric alcohols or 3- or 4-basic carboxylic acids, as described in DE-A 1 900 270 and U.S. Pat. No. 3 692 744. Examples of preferred branching agents are trimesic acid, trimellitic acid, trimethylolethane, trimethylolpropane and pentaerythritol. It is advisable to use no more than 1 mole % of the branching agent, based on the acid component.

Polyalkylene terephthalates produced only from terephthalic acid and its reactive derivatives (e.g. its dialkyl esters) and ethylene glycol and/or 1,4-butanediol, and mixtures of these polyalkylene terephthalates, are particularly preferred.

Preferred polyalkylene terephthalates are also copolyesters produced from at least two of the above-mentioned alcohol components: particularly preferred copolyesters are poly(ethylene glycol-1,4-butanediol) terephthalates.

The polyalkylene terephthalates that are preferably suitable generally possess an intrinsic viscosity of 0.4 to 1.5 dl/g, preferably 0.5 to 1.3 dl/g, especially 0.6 to 1.2 dl/g, measured in phenol/o-dichlorobenzene (1:1 parts by weight) at 25° C. in each case.

Suitable polyamides are known homopolyamides, copolyamides and mixtures of these polyamides. These may be partially crystalline and/or amorphous polyamides.

Polyamide-6, polyamide-6,6, mixtures and appropriate copolymers of these components are suitable as partially crystalline polyamides. In addition, partially crystalline polyamides, the acid component of which consists wholly or partly of terephthalic acid and/or isophthalic acid and/or suberic acid and/or sebacic acid and/or azelaic acid and/or adipic acid and/or cyclohexanedicarboxylic acid, the diamine component of which consists wholly or partly of m- and/or p-xylylenediamine and/or hexamethylenediamine and/or 2,2,4-trimethylhexamethylenediamine and/or 2,2,4-trimethylhexamethylenediamine and/or isophorone diamine and the composition of which is known in principle, are suitable.

Polyamides produced wholly or partly from lactams with 7–12 C atoms in the ring, with the optional incorporation of one or more of the above-mentioned starting components, are also suitable.

Particularly preferred partially crystalline polyamides are polyamide-6 and polyamide-6,6 and mixtures thereof. Known products may be used as amorphous polyamides. They are obtained by polycondensation of diamines such as ethylenediamine, hexamethylenediamine, decamethylenediamine, 2,2,4- and/or 2,4,4-trimethylhexamethylenediamine, m- and/or p-xylylenediamine, bis(4-aminocyclohexyl)methane, bis(4-aminocyclohexyl)propane, 3,3'-dimethyl-4,4'-diaminodicyclohexylmethane, 3-aminomethyl-3,5,5-trimethylcyclohexylamine, 2,5- and/or 2,6-bis(aminomethyl)norbornane and/or 1,4-diaminomethylcyclohexane with dicarboxylic acids such as oxalic acid, adipic acid, azelaic acid, decanedicarboxylic acid, heptadecanedicarboxylic acid, 2,2,4- and/or 2,4,4-trimethyladipic acid, isophthalic acid and terephthalic acid.

Copolymers obtained by the polycondensation of several monomers are also suitable, as are copolymers produced with the addition of aminocarboxylic acids such as ω-aminocaproic acid, ω-aminoundecanoic acid or ω-aminolauric acid or the lactams thereof. Particularly suitable amorphous polyamides are the polyamides produced from isophthalic acid, hexamethylenediamine and other diamines such as 4,4'-diaminodicyclohexylmethane, isophorone diamine, 2,2,4- and/or 2,4,4-trimethylhexamethylenediamine, 2,5- and/or 2,6-bis(aminomethyl)norbornene; or from isophthalic acid, 4,4'-diaminodicyclohexylmethane and ε-caprolactam; or from isophthalic acid, 3,3'-dimethyl-4,4'-diaminodicyclohexylmethane and laurolactam; or from terephthalic acid and the mixture of 2,2,4- and 2,4,4-trimethyl-hexamethylenediamine isomers.

Instead of the pure 4,4'-diaminodicyclohexylmethane, mixtures of diaminodicyclohexylmethane positional isomers can also be used, composed of
70 to 99 mole % of the 4,4'-diamino isomer
1 to 30 mole % of the 2,4'-diamino isomer
0 to 2 mole % of the 2,2'-diamino isomer and optionally correspondingly more highly condensed diamines, obtained by hydrogenation of technical grade diaminodiphenylmethane. Up to 30% of the isophthalic acid may be replaced by terephthalic acid.

The polyamides preferably have a relative viscosity (measured on a 1 wt. % solution in m-cresol at 25° C.) of 2.0 to 5.0, particularly preferably 2.5 to 4.0.

Preferred compositions according to the invention contain 1 to 60 parts by weight, preferably 5 to 50 parts by weight of grafted rubber components A)+B) and 40 to 99 parts by weight, preferably 50 to 95 parts by weight, of rubber-free thermoplastic polymer C).

If, in addition, other rubber-free thermoplastic resins that are not derived from vinyl monomers are used, the quantity thereof is up to 1000 parts by weight, preferably up to 700 parts by weight and particularly preferably up to 500 parts by weight (based on 100 parts by weight A+B+C in each case).

The production of the compositions according to the invention takes place by mixing components A), B) and C) and optionally other components in conventional mixing units (preferably in multiple roll mills, compounding extruders or internal mixers).

The invention thus also provides a process for the production of the compositions according to the invention, wherein components A), B) and C) and optionally other components are mixed, and compounded and extruded at an elevated temperature, generally at temperatures of 150 to 300° C.

During production, processing, conversion and final shaping, the necessary or useful conventional additives having well recognized function, e.g. antioxidants, UV stabilisers, peroxide destroyers, antistatic agents, lubricants, mould release agents, flame retardants, filler or reinforcing material (glass fibres, carbon fibres etc.) and colorants, may be added to the compositions according to the invention.

The final shaping can be carried out on commercial processing units and comprises e.g. processing by injection moulding, sheet extrusion with optional subsequent thermoforming, cold forming, extrusion of pipes and profiles or calendering.

EXAMPLES

In the following examples, parts and percentages quoted are by weight unless stated otherwise.

Components used

A) Grafted rubbers produced using persulfate compounds as initiator

A1) 60 parts by weight (calculated as solids) of an anionically emulsified monomodal polybutadiene latex produced by free-radical polymerisation, with an average particle diameter $d_{50}$ of 112 nm and a gel content of 91 wt. % are brought to a solids content of approx. 20 wt. % with water. Heating is then carried out to 59° C. and 0.45 parts by weight of $K_2S_2O_8$ (dissolved in water) are added. Over 6 h, 40 parts by weight of a monomer mixture (styrene:acrylonitrile weight ratio=73:27), 0.12 parts by weight of tert.-dodecyl mercaptan and 1.0 parts by weight (calculated as solid substance) of the sodium salt of a resin acid mixture (Dresinate®731, Abieta Chemie GmbH, Gersthofen), dissolved in alkalised water, are added in parallel.

The reaction temperature is increased to 80° C. within the 6 h, after which a 2-hour post-reaction period follows at this temperature. After adding approx. 1 part by weight of a phenolic antioxidant, coagulation is performed with a magnesium sulfate/acetic acid mixture and, after washing with water, the resulting powder is dried at 70° C.

A2) The procedure described in A1) is repeated, using a bimodal polybutadiene latex with an average particle diameter $d_{50}$ of 158 nm (particle size peaks at 112 nm and at 285 nm) and a gel content of 86 wt. %.

A3) The procedure described in A1) is repeated, using a bimodal polybutadiene latex with an average particle diameter $d_{50}$ of 202 nm (particle size peaks at 112 nm and at 285 nm) and a gel content of 82 wt. %.

A4) The procedure described in A1) is repeated, using a monomodal polybutadiene latex with an average particle diameter $d_{50}$ of 191 nm and a gel content of 69 wt. %.

A5) The procedure described in A1) is repeated, using a bimodal polybutadiene latex with an average particle diameter $d_{50}$ of 216 nm (particle size peaks at 191 nm and at 285 nm) and a gel content of 70 wt. %.

A6) The procedure described in A1) is repeated, using a bimodal polybutadiene latex with an average particle diameter $d_{50}$ of 240 nm (particle size peaks at 191 nm and at 285 nm) and a gel content of 71 wt. %.

A7) The procedure described in A1) is repeated, using a bimodal polybutadiene latex with an average particle diameter $d_{50}$ of 245 nm (particle size peaks at 199 nm and at 285 nm) and a gel content of 81 wt. %.

A8) The procedure described in A1) is repeated, using a monomodal polybutadiene latex with an average particle diameter $d_{50}$ of 285 nm and a gel content of 72 wt. %.

A9) The procedure described in A1) is repeated, using a bimodal polybutadiene latex with an average particle diameter $d_{50}$ of 350 nm (particle size peaks at 285 nm and at 415 nm) and a gel content of 70 wt. %.

A10) The procedure described in A1) is repeated, using a monomodal polybutadiene latex with an average particle diameter $d_{50}$ of 415 nm and a gel content of 70 wt. %.

B) Grafted rubbers produced using azo initiators

B1) 60 parts by weight (calculated as solids) of an anionically emulsified monomodal polybutadiene latex produced by free-radical polymerisation, with an average particle diameter $d_{50}$ of 285 nm and a gel content of 72 wt. %, are brought to a solids content of approx. 20 wt. % with water. Heating is then carried out to 59° C. and 1 part by weight of the compound (I) with R=$C_2H_5$ (Vazo 67, DuPont Deutschland GmbH, Bad Homburg v.d.H.) (dissolved in part of the monomer mixture) are added. Over 6 h, 40 parts by weight of a monomer mixture (styrene:acrylonitrile weight ratio=73:27), 0.12 parts by weight of tert.-dodecyl mercaptan and 1.38 parts by weight (calculated as solid substance) of the sodium salt of a resin acid mixture (Dresinate®731, Abieta Chemie GmbH, Gersthofen), dissolved in alkalised water, are added in parallel.

The reaction temperature is increased to 80° C. within the 6 h, after which a 2-hour post-reaction period follows at this temperature. After adding approx. 1 part by weight of a phenolic antioxidant, coagulation is performed with a magnesium sulfate/acetic acid mixture and, after washing with water, the resulting powder is dried at 70° C.

B2) The procedure described in B1) is repeated, using a bimodal polybutadiene latex with an average particle diameter $d_{50}$ of 350 nm (particle size peaks at 285 nm and at 415 nm) and a gel content of 70 wt. %.

B3) The procedure described in B1) is repeated, using a monomodal polybutadiene latex with an average particle diameter $d_{50}$ of 415 nm and a gel content of 70 wt. %.

C) Thermoplastic resins

C1) Styrene/acrylonitrile (SAN) copolymer resin produced by solution polymerisation (styrene:acrylonitrile weight ratio=72:28, $\overline{M}_w$ ∪85 000, determined by gel permeation chromatography).

C2) Styrene/acrylonitrile (SAN) copolymer resin produced by solution polymerisation (styrene:acrylonitrile weight ratio=72:28, $\overline{M}_w$ ∪115 000, determined by gel permeation chromatography).

Testing the moulding compositions

The polymer components described above in the proportions given in table 1, 2 parts by weight of ethylenediamine bisstearamide and 0.1 parts by weight of a silicone oil are mixed in an internal mixer and, after granulation, are processed into test pieces and into a flat sheet (to assess the surface and the contrast ratio, dimensions 60×40×2 mm).

The following data were established:

Notched impact resistance at room temperature ($a_k$(RT)) and at −20° C. ($a_k$(−20° C.)) according to ISO 180/1A (unit: $kJ/m^2$), Softening point (Vicat B) according to DIN 53 460 (unit: °C.), Surface gloss according to DIN 67 530 with an angle of reflection of 20°(reflectometer value), Yellowness index (YI) in accordance with ASTM standard D 1925 (illuminant: C, observer: 2°, measurement aperture: Large Area Value) according to the equation YI=(128X−106Z)/Y, with X, Y, Z=colour coordinates according to DIN 5033, Contrast ratio (CR) as a measure of the opacity of the material by measuring a sample against a black and a white background according to $$CR = \frac{Y(\text{against black background})}{Y(\text{against white background})} \times 100,$$

wherein Y describes the standard colour value from the CIElab colour space with illuminant D 65 and 10° observer (cf. DIN 5033, Ulbricht sphere). The measurement took place using a Dataflash SF 600 Plus CT spectrophotometer.

The processability of the moulding compositions was evaluated by measuring the injection pressure required at 240° C. (unit: bar) (cf. S. Anders et al., Kunststoffe 81 (1991), 4, pages 336 to 340 and literature cited there).

The results are compiled in table 2.

It can be seen from this table that the moulding compositions according to the invention exhibit markedly improved toughness values, lower yellowness index values and lower opacity values in direct comparison with the respective comparative example, and therefore the quantity of pigment required to obtain the desired colour is clearly reduced. Other important properties, such as heat resistance, processability in the plastic state and surface gloss, are not impaired.

TABLE 1

Compositions of the moulding compositions tested

| Example | A1 (parts by wt.) | A2 (parts by wt.) | A3 (parts by wt.) | A4 (parts by wt.) | A5 (parts by wt.) | A6 (parts by wt.) | A7 (parts by wt.) | A8 (parts by wt.) | A9 (parts by wt.) | A10 (parts by wt.) | B1 (parts by wt.) | B2 (parts by wt.) | B3 (parts by wt.) | C1 (parts by wt.) | C2 (parts by wt.) |
|---|---|---|---|---|---|---|---|---|---|---|---|---|---|---|---|
| 1 | 16.2 | — | — | — | — | — | — | — | — | — | 10.8 | — | — | 73 | — |
| 2(comp.) | 16.2 | — | — | — | — | — | — | 10.8 | — | — | — | — | — | 73 | — |
| 3 | — | 16.2 | — | — | — | — | — | — | — | — | 10.8 | — | — | 73 | — |
| 4(comp.) | — | 16.2 | — | — | — | — | — | 10.8 | — | — | — | — | — | 73 | — |
| 5 | — | — | 16.2 | — | — | — | — | — | — | — | 10.8 | — | — | 73 | — |
| 6(comp.) | — | — | 16.2 | — | — | — | — | 10.8 | — | — | — | — | — | 73 | — |
| 7 | — | — | — | 16.2 | — | — | — | — | — | — | 10.8 | — | — | 73 | — |
| 8(comp.) | — | — | — | 16.2 | — | — | — | 10.8 | — | — | — | — | — | 73 | — |
| 9 | — | — | — | — | 16.2 | — | — | — | — | — | 10.8 | — | — | 73 | — |
| 10(comp.) | — | — | — | — | 16.2 | — | — | 10.8 | — | — | — | — | — | 73 | — |
| 11 | — | — | — | — | — | 16.2 | — | — | — | — | 10.8 | — | — | 73 | — |
| 12(comp.) | — | — | — | — | — | 16.2 | — | 10.8 | — | — | — | — | — | 73 | — |
| 13 | 16.2 | — | — | — | — | — | — | — | — | — | — | 10.8 | — | 73 | — |
| 14(comp.) | 16.2 | — | — | — | — | — | — | — | 10.8 | — | — | — | — | 73 | — |
| 15 | — | 16.2 | — | — | — | — | — | — | — | — | — | 10.8 | — | 73 | — |
| 16(comp.) | — | 16.2 | — | — | — | — | — | — | 10.8 | — | — | — | — | 73 | — |
| 17 | — | — | 16.2 | — | — | — | — | — | — | — | — | 10.8 | — | 73 | — |
| 18(comp.) | — | — | 16.2 | — | — | — | — | — | 10.8 | — | — | — | — | 73 | — |
| 19 | — | — | — | 16.2 | — | — | — | — | — | — | — | 10.8 | — | 73 | — |
| 20(comp.) | — | — | — | 16.2 | — | — | — | — | 10.8 | — | — | — | — | 73 | — |
| 21 | — | — | — | — | 16.2 | — | — | — | — | — | — | 10.8 | — | 73 | — |
| 22(comp.) | — | — | — | — | 16.2 | — | — | — | 10.8 | — | — | — | — | 73 | — |
| 23 | — | — | — | — | — | 16.2 | — | — | — | — | — | 10.8 | — | 73 | — |
| 24(comp.) | — | — | — | — | — | 16.2 | — | — | 10.8 | — | — | — | — | 73 | — |
| 25 | — | — | — | — | — | — | 16.2 | — | — | — | — | 10.8 | — | 73 | — |
| 26(comp.) | — | — | — | — | — | — | 16.2 | — | 10.8 | — | — | — | — | 73 | — |
| 27 | — | — | — | — | 24.0 | — | — | — | — | — | 16.0 | — | — | — | 60 |
| 28(comp.) | — | — | — | — | 24.0 | — | — | — | — | 16.0 | — | — | — | — | 60 |
| 29 | — | — | — | — | — | 24.0 | — | — | — | — | 16.0 | — | — | — | 60 |
| 30(comp.) | — | — | — | — | — | 24.0 | — | — | — | 16.0 | — | — | — | — | 60 |
| 31 | 16.2 | — | — | — | — | — | — | — | — | — | — | — | 10.8 | 73 | — |
| 32(comp.) | 16.2 | — | — | — | — | — | — | — | — | 10.8 | — | — | — | 73 | — |
| 33 | — | 16.2 | — | — | — | — | — | — | — | — | — | — | 10.8 | 73 | — |
| 34(comp.) | — | 16.2 | — | — | — | — | — | — | — | 10.8 | — | — | — | 73 | — |
| 35 | — | — | 16.2 | — | — | — | — | — | — | — | — | — | 10.8 | 73 | — |
| 36(comp.) | — | — | 16.2 | — | — | — | — | — | — | 10.8 | — | — | — | 73 | — |
| 37 | — | — | — | 16.2 | — | — | — | — | — | — | — | — | 10.8 | 73 | — |
| 38(comp.) | — | — | — | 16.2 | — | — | — | — | — | 10.8 | — | — | — | 73 | — |
| 39 | — | — | — | — | 16.2 | — | — | — | — | — | — | — | 10.8 | 73 | — |
| 40(comp.) | — | — | — | — | 16.2 | — | — | — | — | 10.8 | — | — | — | 73 | — |
| 41 | — | — | — | — | — | 16.2 | — | — | — | — | — | — | 10.8 | 73 | — |
| 42(comp.) | — | — | — | — | — | 16.2 | — | — | — | 10.8 | — | — | — | 73 | — |

TABLE 2

Test values of the compositions investigated

| Example | $a_k^{(R1)}$ (kJ/m$^2$) | $a_k^{(-20° C.)}$ (kJ/m$^2$) | Vicat B (° C.) | Injection pressure (bar) | Gloss | Yl | CR (%) |
|---|---|---|---|---|---|---|---|
| 1 | 9.1 | 8.3 | 103 | 136 | 92 | 32 | 72 |
| 2(comp.) | 7.7 | 6.5 | 104 | 140 | 91 | 38 | 75 |
| 3 | 12.8 | 9.4 | 104 | 136 | 92 | 33 | 74 |
| 4(comp.) | 10.1 | 7.7 | 103 | 139 | 91 | 37 | 76 |
| 5 | 14.5 | 10.3 | 103 | 139 | 91 | 35 | 74 |
| 6(comp.) | 13.2 | 7.7 | 103 | 142 | 91 | 37 | 77 |
| 7 | 14.8 | 11.2 | 103 | 140 | 92 | 35 | 78 |
| 8(comp.) | 11.3 | 9.1 | 103 | 142 | 91 | 37 | 80 |
| 9 | 15.3 | 11.4 | 103 | 142 | 92 | 35 | 79 |
| 10(comp.) | 14.0 | 9.2 | 103 | 142 | 91 | 39 | 81 |
| 11 | 16.0 | 12.5 | 103 | 142 | 92 | 35 | 79 |
| 12(comp.) | 14.4 | 8.3 | 103 | 144 | 92 | 39 | 80 |
| 13 | 10.2 | 10.0 | 103 | 137 | 92 | 34 | 74 |
| 14(comp.) | 7.2 | 6.1 | 103 | 136 | 92 | 36 | 75 |
| 15 | 13.2 | 10.2 | 103 | 139 | 92 | 34 | 74 |
| 16(comp.) | 9.0 | 6.6 | 104 | 136 | 92 | 36 | 75 |
| 17 | 15.1 | 10.5 | 103 | 140 | 92 | 34 | 74 |
| 18(comp.) | 12.1 | 7.7 | 103 | 137 | 91 | 37 | 77 |
| 19 | 15.6 | 12.3 | 103 | 140 | 92 | 36 | 77 |
| 20(comp.) | 12.0 | 7.5 | 103 | 139 | 91 | 37 | 80 |
| 21 | 16.2 | 12.5 | 103 | 140 | 92 | 35 | 78 |
| 22(comp.) | 13.3 | 7.3 | 103 | 139 | 92 | 38 | 80 |
| 23 | 17.8 | 12.1 | 103 | 142 | 92 | 34 | 77 |
| 24(comp.) | 15.2 | 7.5 | 103 | 139 | 91 | 38 | 80 |
| 25 | 17.5 | 11.1 | 103 | 140 | 92 | 34 | 77 |
| 26(comp.) | 14.5 | 7.5 | 103 | 139 | 92 | 39 | 80 |
| 27 | 29.8 | 22.4 | 100 | 187 | 92 | 32 | 83 |
| 28(comp.) | 24.9 | 16.8 | 99 | 186 | 92 | 34 | 86 |
| 29 | 31.4 | 23.0 | 99 | 188 | 91 | 27 | 82 |
| 30(comp.) | 24.8 | 16.8 | 100 | 187 | 91 | 30 | 85 |
| 31 | 11.3 | 9.7 | 103 | 131 | 94 | 34 | 74 |
| 32(comp.) | 8.8 | 7.0 | 104 | 137 | 92 | 38 | 75 |
| 33 | 13.7 | 10.1 | 103 | 134 | 93 | 34 | 74 |
| 34(comp.) | 11.5 | 7.4 | 103 | 137 | 92 | 40 | 76 |

TABLE 2-continued

Test values of the compositions investigated

| Example | $a_k^{(R1)}$ (kJ/m²) | $a_k^{(-20° C.)}$ (kJ/m²) | Vicat B (° C.) | Injection pressure (bar) | Gloss | Yl | CR (%) |
|---|---|---|---|---|---|---|---|
| 35 | 16.3 | 10.1 | 102 | 135 | 94 | 35 | 76 |
| 36(comp.) | 13.6 | 7.4 | 103 | 134 | 92 | 40 | 77 |
| 37 | 16.0 | 11.3 | 103 | 132 | 94 | 36 | 79 |
| 38(comp.) | 14.0 | 7.3 | 103 | 135 | 92 | 41 | 81 |
| 39 | 17.1 | 11.3 | 103 | 135 | 93 | 36 | 79 |
| 40(comp.) | 15.1 | 7.4 | 104 | 137 | 92 | 39 | 80 |
| 41 | 18.3 | 11.8 | 103 | 137 | 94 | 37 | 79 |
| 42(comp.) | 16.7 | 7.3 | 103 | 136 | 92 | 41 | 81 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition comprising
   A) at least one first grafted rubber that is a product of free-radical emulsion polymerisation wherein at least one vinyl monomer is polymerized in the presence of at least one rubber a) that is present in the form of a latex, said rubber having a glass transition temperature lower than 0° C., the polymerization being initiated by at least one compound selected from the group consisting of ammonium persulfate, potassium persulfate and sodium persulfate,
   B) at least one second grafted rubber that is a product of free-radical emulsion polymerisation wherein at least one vinyl monomer is polymerized in the presence of at least one rubber b) that is present in the form of a latex, said rubber having a glass transition temperature lower than 0° C., the polymerization being initiated by at least one azo compound, and optionally
   C) at least one thermoplastic, rubber-free polymer that is the product of the polymerisation of at least one resin-forming vinyl monomer.

2. The composition of claim 1 wherein said at least vinyl monomer of said A) comprise styrene and acrylonitrile in a weight ratio of 90:10 to 50:50 therebetween or a composition in at least one of said styrene and acrylonitrile is at least partly replaced by at least one member selected from the group consisting of alpha methylstyrene, methyl methacrylate and N-phenylmaleimide.

3. The composition of claim 2 wherein at least one of said styrene and acrylonitrile is at least partly replaced by at least one member selected from the group consisting of α-methylstyrene, methyl methacrylate and N-phenylmaleimide.

4. The composition of claim 1 wherein said at least vinyl monomer of said B) comprise styrene and acrylonitrile in a weight ratio of 90:10 to 50:50 therebetween or a composition in at least one of said styrene and acrylonitrile is at least partly replaced by at least one member selected from the group consisting of alpha methylstyrene, methyl methacrylate and N-phenylmaleimide.

5. The composition of claim 4 wherein at least one of said styrene and acrylonitrile is at least partly replaced by at least one member selected from the group consisting of α-methylstyrene, methyl methacrylate and N-phenylmaleimide.

6. The composition of claim 2 wherein at least one resin-forming vinyl monomer of said C) is styrene and acrylonitrile in a weight ratio of 90:10 to 50:50 therebetween or a composition in at least one of said styrene and acrylonitrile is at least partly replaced by at least one member selected from the group consisting of alpha methylstyrene, methyl methacrylate and N-phenylmaleimide.

7. The composition of claim 6 wherein at least one of said styrene and acrylonitrile is at least partially replaced by at least one member selected from the group consisting of α-methylstyrene, methyl methacrylate and N-phenylmaleimide.

8. The composition of claim 1 wherein said azo compound is at least one member selected from the group consisting of compounds conforming to formulae (I), (II), (III) and (IV):

wherein (I) is $$R-\underset{\underset{CN}{|}}{\overset{\overset{CH_3}{|}}{C}}-N=N-\underset{\underset{CN}{|}}{\overset{\overset{CH_3}{|}}{C}}-R \qquad (I)$$

with R=CH₃, C₂H₅, n-C₃H₇, i-C₃H₇, n-C₄H₉, i-C₄H₉, t-C₄H₉

(II) cyclohexyl-C(CN)-N=N-C(CN)-cyclohexyl, +

(III) 
$$H_3C-\underset{\underset{CN}{|}}{\overset{\overset{CH_3}{|}}{C}}-N=N-\underset{\underset{COOCH_3}{|}}{\overset{\overset{CH_3}{|}}{C}}-CH_3, \text{ and}$$

(IV)
$$H_3C-\underset{\underset{OCH_3}{|}}{\overset{\overset{CH_3}{|}}{C}}-CH_2-\underset{\underset{CN}{|}}{\overset{\overset{CH_3}{|}}{C}}-N=N-\underset{\underset{CN}{|}}{\overset{\overset{CH_3}{|}}{C}}-CH_2-\underset{\underset{OCH_3}{|}}{\overset{\overset{CH_3}{|}}{C}}-CH_3.$$

9. The composition of claim 1, wherein A) is present in an amount of 20 to 90% and B) is present in an amount of 10 to 80%, said percents, both occurrences, being relative to the total weight of A, B and C.

10. The composition of claim 1 wherein A) is present in an amount of 30 to 80% and B) is present in an amount of 20 to 70%, said percents, both occurrences, being relative to the total weight of A, B and C.

11. The composition of claim 1 wherein C is present in an amount of 50 to 2000 parts by weight per 100 parts by weight of the total weight of A +B.

12. The composition of claim 1 wherein C is present in an amount of 100 to 1500 parts by weight per 100 parts by weight of the total weight of A+B.

13. The composition of claim 1 further containing at least one resin selected from the group consisting of aromatic polycarbonate, aromatic polyester carbonate, polyester and polyamide.

14. The composition of claim 1 wherein the rubber latices of said A and of said B conform to monomodal distributions of particle sizes.

15. The composition of claim 1 wherein the rubber latices of said A and of said B conform to bimodal distributions of particle sizes.

16. The composition of claim 1 wherein the rubber latex of said A conforms to a monomodal particle size distribution and the rubber latex of said B conforms to a bimodal particle size distribution.

17. The composition of claim 1 wherein the rubber latex of said A conforms to a monomodal particle size distribution and the rubber latex of said B conforms to a trimodal particle size distribution.

18. The composition of claim 1 wherein the rubber latex of said A conforms to a bimodal particle size distribution and the rubber latex of said B conforms to a trimodal particle size distribution.

19. The composition of claim 1 wherein the rubber latex of said A conforms to a bimodal particle size distribution and the rubber latex of said B conforms to a monomodal particle size distribution.

20. The composition of claim 1 wherein rubber latices of said A and of said B have average particles diameters ($d_{50}$) of 50 to 600 nm.

21. The composition of claim 20 wherein ($d_{50}$) is 100 to 500 nm.

22. The composition of claim 1 wherein average particle diameter ($d_{50}$) of the rubber latex of A is smaller than the average particle diameter ($d_{50}$) of the rubber latex of B.

23. A method of using the composition of claim 1 comprising producing a molded article.

24. The moldings produced by the method of claim 23.

25. A process for the production of thermoplastic molding compositions comprising mixing at an elevated temperature A) at least one grafted rubber that is a product of free-radical emulsion polymerisation wherein at least one vinyl monomer is polymerized in the presence of at least one rubber a) that is present in the form of a latex, said rubber having a glass transition temperature lower than 0° C., the polymerization being initiated by at least one compound selected from the group consisting of ammonium persulfate, potassium persulfate and sodium persulfate, with B) at least one grafted rubber that is a product of free-radical emulsion polymerisation wherein at least one vinyl monomer is polymerized in the presence of at least one rubber b) that is present in the form of a latex, said rubber having a glass transition temperature lower than 0° C., the polymerization being initiated by at least one azo compound, and optionally C) at least one thermoplastic, rubber-free polymer that is the product of the polymerisation of at least one resin-forming vinyl monomer.

* * * * *